(12) United States Patent
Sun et al.

(10) Patent No.: US 12,160,279 B2
(45) Date of Patent: Dec. 3, 2024

(54) AUTOMOTIVE PHYSICAL LAYER (PHY) CABLE FAULT DIAGNOSIS

(71) Applicant: Marvell Asia Pte Ltd, Singapore (SG)

(72) Inventors: Wensheng Sun, San Jose, CA (US); Shaoan Dai, San Jose, CA (US); Xing Wu, Palo Alto, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 294 days.

(21) Appl. No.: 17/533,177

(22) Filed: Nov. 23, 2021

(65) Prior Publication Data

US 2022/0166461 A1 May 26, 2022

Related U.S. Application Data

(60) Provisional application No. 63/118,484, filed on Nov. 25, 2020.

(51) Int. Cl.
| | | |
|---|---|---|
| *H04B 3/493* | (2015.01) | |
| *G06N 20/00* | (2019.01) | |
| *G07C 5/08* | (2006.01) | |
| *H04L 67/12* | (2022.01) | |

(52) U.S. Cl.
CPC ............ *H04B 3/493* (2015.01); *G06N 20/00* (2019.01); *G07C 5/0816* (2013.01); *H04L 67/12* (2013.01); *G06F 2218/10* (2023.01); *G06F 2218/16* (2023.01)

(58) Field of Classification Search
CPC ............ H04W 56/0015; H04W 16/28; H04W 56/001; H04W 56/004; H04W 56/0055; H04W 74/0833
See application file for complete search history.

(56) References Cited

U.S. PATENT DOCUMENTS

| | | | |
|---|---|---|---|
| 8,639,468 | B2 | 1/2014 | Cloetens |
| 10,554,521 | B1 | 2/2020 | Terechko et al. |
| 11,353,517 | B1 | 6/2022 | Dewan et al. |
| 2017/0134215 | A1* | 5/2017 | Chini ................. H04L 41/0631 |
| 2019/0050515 | A1 | 2/2019 | Su et al. |
| 2019/0165921 | A1* | 5/2019 | Wu ..................... H04L 1/0015 |
| 2019/0215030 | A1* | 7/2019 | Nabki .................. H04W 56/00 |
| 2019/0279447 | A1 | 9/2019 | Ricci |
| 2019/0379589 | A1 | 12/2019 | Ryan et al. |
| 2021/0058168 | A1* | 2/2021 | Zang ..................... H04B 17/29 |
| 2021/0141011 | A1* | 5/2021 | Ben Hassen ......... G01R 31/083 |
| 2021/0351885 | A1 | 11/2021 | Chavva et al. |

(Continued)

FOREIGN PATENT DOCUMENTS

| | | |
|---|---|---|
| CN | 112736268 A | 4/2021 |
| WO | 2010013093 A1 | 2/2010 |

(Continued)

OTHER PUBLICATIONS

Lei et al., Applications of machine learning to machine fault diagnosis: A review and roadmap, Jan. 3, 2020, Mechanical Systems and Signal Processing vol. 138, 106587 (Year: 2020).*

(Continued)

*Primary Examiner* — Charles C Jiang
*Assistant Examiner* — Rachel Elizabeth Marks

(57) ABSTRACT

Methods and systems provide for using echo measurements, to detect cable faults in cables of vehicular communication networks.

14 Claims, 10 Drawing Sheets

(56) References Cited

U.S. PATENT DOCUMENTS

2021/0366207 A1 11/2021 Seidel et al.
2022/0092321 A1 3/2022 Keiser et al.
2023/0041290 A1 2/2023 Cooper

FOREIGN PATENT DOCUMENTS

WO 2019185657 A1 10/2019
WO 2020160761 A1 8/2020

OTHER PUBLICATIONS

Yaguo Lei et al., Applications of machine learning to machine fault diagnosis: a review and roadmap—Mechanical Systems and Signal Processing vol. 138, Apr. 2020 (Year: 2020).*
International Application # PCT/IB2021/057306 Search Report dated Nov. 26, 2021.
Farjadrad et al., U.S. Appl. No. 17/396,710, filed Aug. 8, 2021.
IEEE Std. 802.3bw-2015, "IEEE Standard for Ethernet—Amendment 1: Physical Layer Specifications and Management Parameters for 100 Mb/s Operation over a Single Balanced Twisted Pair Cable (100BASE-T1)," IEEE Computer Society, pp. 1-88, Oct. 26, 2015.
IEEE Std. 802.3bp-2016, "IEEE Standard for Ethernet—Amendment 4: Physical Layer Specifications and Management Parameters for 1 Gb/s Operation over a Single Twisted-Pair Copper Cable," IEEE Computer Society, pp. 1-211, Jun. 30, 2016.
IEEE Std. P802.3cy Draft, "IEEE Standard for Ethernet—Amendment: Physical Layer Specifications and Management Parameters for Greater than 10 Gb/s Automotive Electrical Ethernet," IEEE Computer Society, Ethernet Working Group (C/LM/WG802. 3), pp. 1-2, Nov. 15, 2019.
EP Application # 21210528.2 Search Report dated May 6, 2022.
Song et al., "Self-Supervised Anomaly Detection for In-Vehicle Network Using Noised Pseudo Normal Data," IEEE Transactions on Vehicular Technology, vol. 70, No. 2, pp. 1098-1108, Feb. 2021.
EP Application # 22176121.6 Search Report dated Nov. 16, 2022.
U.S. Appl. No. 17/396,710 Office Action dated Oct. 12, 2023.
U.S. Appl. No. 17/396,710 Office Action dated Jan. 25, 2024.
U.S. Appl. No. 17/396,710 Office Action dated Apr. 18, 2024.
Terven et al., "Loss Functions and Metrics in Deep Learning," A Preprint, arXiv:2307.02694v2, pp. 1-53, Sep. 6, 2023.

* cited by examiner

AUTOMOTIVE PHYSICAL LAYER (PHY) CABLE FAULT DIAGNOSIS

CROSS-REFERENCE TO RELATED APPLICATIONS

This application claims the benefit of commonly owned U.S. Provisional Patent Application 63/118,484, filed Nov. 25, 2020, whose disclosure is incorporated herein by reference.

FIELD OF THE DISCLOSURE

The present disclosure relates generally to in-vehicle networks, and particularly to methods and systems for diagnosing faults in cables of in-vehicle networks.

BACKGROUND

Modern vehicles, including, in particular, autonomous vehicles, operate while generating very large amounts of data that is being sensed or otherwise detected, analyzed, and transmitted over the in-vehicle network via cables. Faults in these cables may result in the in-vehicle network functioning at reduced speeds, functioning incorrectly, or not functioning at all. Faults in the cables typically result from aging and physical damage. Should the cables fail, or function improperly, the vehicle may become unsafe or inoperative, with repairs to the vehicle and the in-vehicle network being costly.

The description above is presented as a general overview of related art in this field and should not be construed as an admission that any of the information it contains constitutes prior art against the present patent application.

SUMMARY

The present disclosed subject matter is directed to methods and systems for using echo measurements, to detect cable faults in cables of vehicular communication networks. The aforementioned systems and methods detect numerous cable fault types, including short to ground and short to power cable faults, that previously were not detectable, due to system design limits. Additionally, the method and system are easily fitted into existing vehicular communication networks, as there is no need for special hardware wen using the method or system with an existing vehicular communication network.

Embodiments of the disclosed subject matter are directed to a method for fault diagnosis in one or more cables of a vehicular communication network. The method comprises: obtaining at least one return echo signal corresponding to a signal communicated over a cable in a vehicle; applying, to the at least one return echo signal, a computer trained model that distinguishes among a plurality of predetermined fault types in cables, so as to identify a predetermined fault type, based on characteristics of the return echo signal learned from computer analysis of a multiplicity of previous echo signals, from amongst at least two different predetermined fault types, in the cable; and, initiating an action in response to the identified predetermined fault type.

In some embodiments, the method for fault diagnosis is such that the applying the computer trained model comprises applying an Artificial Intelligence (AI) model that is pre-trained to distinguish the predetermined fault type in the cable from amongst the at least two predetermined fault types.

In some embodiments, the method for fault diagnosis is such that the AI model comprises multiple feature-extraction layers configured to determine that the cable has a fault, and to identify the predetermined fault type. In some embodiments, the method for fault diagnosis is such that the obtaining the at least one return echo signal comprises receiving the at least one return echo signal by an Ethernet physical layer (PHY) device that applies echo cancellation in response to the receiving the at least one return echo signal. In some embodiments, the method for fault diagnosis is such that the characteristics of the return signal include a shape of the return echo signal, and wherein the applying the computer trained model includes analyzing the shape of the return echo signal against a predetermined shape of at least two return echo signals, each of the predetermined shapes associated with a predetermined fault type from amongst at least two different predetermined fault types.

In some embodiments, the method for fault diagnosis is such that the applying the computer trained model to the at least one return echo signal includes determining a probability of the one or more cables exhibiting the identified predetermined cable fault type selected from amongst at least two different predetermined cable fault types. In some embodiments, the method for fault diagnosis is such that the AI model includes one or more of: a trained neural network and/or a machine learning model. In some embodiments, the method for fault diagnosis is such that the plurality of predetermined fault types in cables includes two or more of:
short circuit (short);
open circuit (Open);
open and ground;
normal and ground;
one wire shorted to ground;
one wire shorted to power;
one wire open;
two wires shorted to ground;
two wires shorted to power; and
two wires open.

In some embodiments, the method for fault diagnosis is such that the at least one return echo signal includes a plurality of return echo signals, each return echo signal acquired from a corresponding cable; and applying the computer trained model to analyze each return echo signal to identify a predetermined fault type in each cable, from amongst at least two predetermined fault types. In some embodiments, the method is such that the initiating an action comprises one or more of: logging the fault, issuing an alert, notifying the driver or other user, and switching to a backup cable.

Embodiments of the disclosed subject matter are directed to a system for diagnosing faults in one or more cables of a vehicular communication network. The fault diagnosis system comprises: one or more processors; and, a program memory storing executable instructions. The executable instructions are such that when they are executed by the one or more processors, they cause the system to: obtain at least one return echo signal corresponding to a signal communicated over a cable in a vehicle; apply, to the at least one return echo signal, a computer trained model that distinguishes among a plurality of predetermined fault types in cables, so as to identify a predetermined fault type, based on characteristics of the return echo signal learned from computer analysis of a multiplicity of previous echo signals, from amongst at least two different predetermined fault types, in the cable; and, initiate an action in response to the identified fault type.

In some embodiments, the system for diagnosing faults is such that the executable instructions further cause the system to apply the computer trained model to analyze the characteristics of the return echo signal including a shape of the return echo signal, to determine the probability of the identified predetermined fault type from amongst at least two different predetermined fault types, in the cable. In some embodiments, the system for diagnosing faults is such that the computer trained model is stored in the program memory and comprises an Artificial Intelligence (AI) model to determine a probability of the identified predetermined type of fault from amongst at least two different predetermined fault types, in the cable. In some embodiments, the system for diagnosing faults is such that the AI model includes one or more of: a trained neural network and/or a machine learning model.

Embodiments of the disclosed subject matter are directed to an ethernet physical layer (PHY) device for communication over a cable in an automotive or industrial network. The ethernet PHY device comprises: a transmitter for transmitting outbound Ethernet communication signals to the cable; a receiver for receiving inbound Ethernet communication signals from the cable, the inbound Ethernet communication signals comprising return echo signals caused by the transmitted outbound Ethernet communication signals; an echo canceller for estimating the return echo signals and cancelling the return echo signals in the received inbound Ethernet communication signals; and, storage media in communication with the echo canceller for storing the estimated return echo signals, the stored estimated return echo signals being available for readout by a device external to the ethernet physical layer device. In some embodiments, the ethernet physical layer device is such that the return echo signal is of a predetermined size.

The present disclosure will be more fully understood from the following detailed description of the embodiments thereof, taken together with the drawings in which:

BRIEF DESCRIPTION OF THE DRAWINGS

FIG. 1A-2 is a diagram of the insert of FIG. 1A-1;

FIG. 2 is a diagram of an example physical-layer (PHY) transceiver, used inter alia to obtain return echo data measurements in accordance with an embodiment described herein;

DETAILED DESCRIPTION OF EMBODIMENTS

Figures 1, 1A:
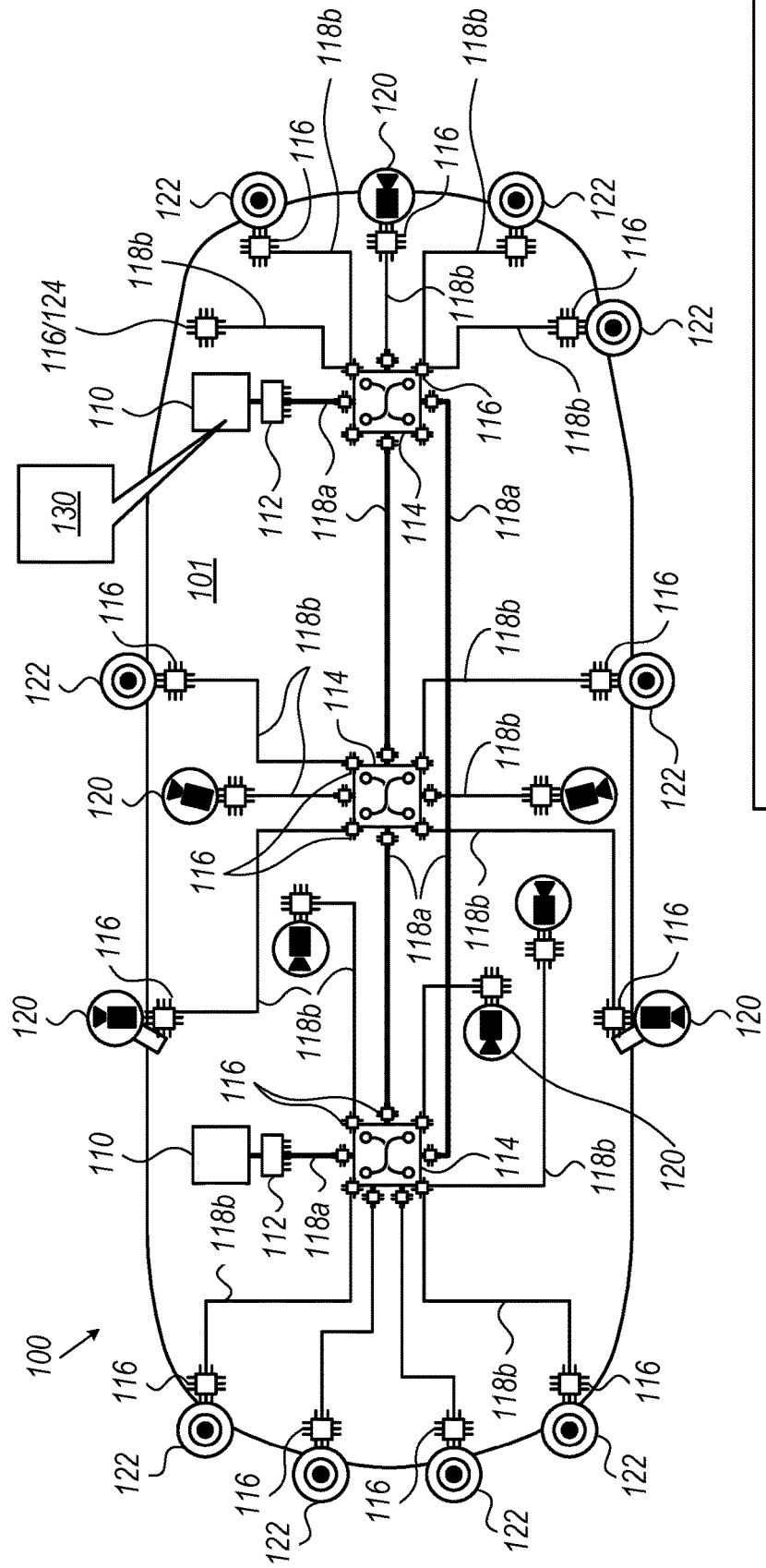
FIG. 1A-1 is a block diagram of an example in-vehicle network (IVN) in a vehicle, operating in accordance with an embodiment that is described herein.

FIG. 1A-1 shows a vehicle 100, for example, an automobile, with an in-vehicle network (IVN) 101, also known as a vehicular communication network, these terms used interchangeably herein. The vehicle 100, may be a standard non-autonomous vehicle, or an autonomous vehicle, classified at any of Society of Automotive Engineers (SAE) Levels, 0 No Automation, 1 Driver Assistance, 2 Partial Automation, 3 Conditional Automation, 4 High Automation, 5 Full Automation. The vehicular communication network includes, for example, integrated circuit (IC) chips for performing various functions. There are also multiple cables, which connect the various components of the vehicular communication network. With this arrangement in the IVN, the disclosed subject matter works on the link and network levels.

The vehicular communication network 101 includes processors 110, for instance Central Processing Units (CPUs), Graphics Processing Units (GPUs) or other suitable computer processing device, which are representative of a vehicle computer, also known herein as a local computer. The processors 110 communicate with controllers 112 and switches/gateways 114, via physical layer devices (PHYs) 116, over Ethernet links 118a, directly or indirectly. The switches/gateways 114 communicate with each other via PHYs 116 over Ethernet links 118a, directly or indirectly. The switches/gateways 114 communicate with PHYs 116 over Ethernet links 118b, directly or indirectly.

The links 118a, 118b comprise, for example, cables, also known as ethernet cables, for transmission of data and/or for delivering electrical power. The links 118a, 118b are also referred to hereinafter as "cables" or "ethernet cables". The cable types may be shielded or unshielded, single stranded or multi-stranded, with the multi-stranded cables being, for example, twisted pair cables. The data carrying capacity may not be the same for all cable types. For example, in an embodiment, the ethernet links 118a support 10/25 Gbps data rates, while the Ethernet links 118b support 2.5/5/10 Gpbs data rates.

Each PHY 116 links, typically via a suitable Medium Access Control (MAC) device, link partners, such as between an electronic unit and a local computer, i.e., processors 110. The electronic unit includes, for example, cameras 120, radar/lidar/sonar 122, or other suitable sensors 124, such as temperature sensors, magnetic field sensors, and the like. The PHYs 116 communicate over cables with local computers, i.e., processors 110, typically via switches 114 and controllers 112.

Each link 118a, 118b has at least one end connected to a switch 114. Typically, an echo signal acquired at one end of a link is sufficient for diagnosing the Ethernet cable. Thus, in an embodiment, the switch 114 reads an echo signal, for example, from the memory 220 (FIG. 2) of the PHY 116 it is locally connected to, and relays the echo signal, in the form of echo measurements representative of the return echo signals, to the processor 110. A trained computer model 400, such as an Artificial Intelligence (AI) model, downloaded by and running in the processor 110, receives this echo measurement as input.

In an embodiment, the PHYs 116 receive echo signals, e.g., return echo signals, from the cables 118a, 118b, estimate corresponding return echo signals, and, via the switch 114, transmit the estimated return echo signal back over the ethernet cable 118a, 118b, for example, as echo measurements. An example PHY 116 for receiving return echo signals, and estimating the echo cancellation signals as echo measurements, is shown for example, in FIG. 2, which is detailed below.

Figures 1, 1A, 2:
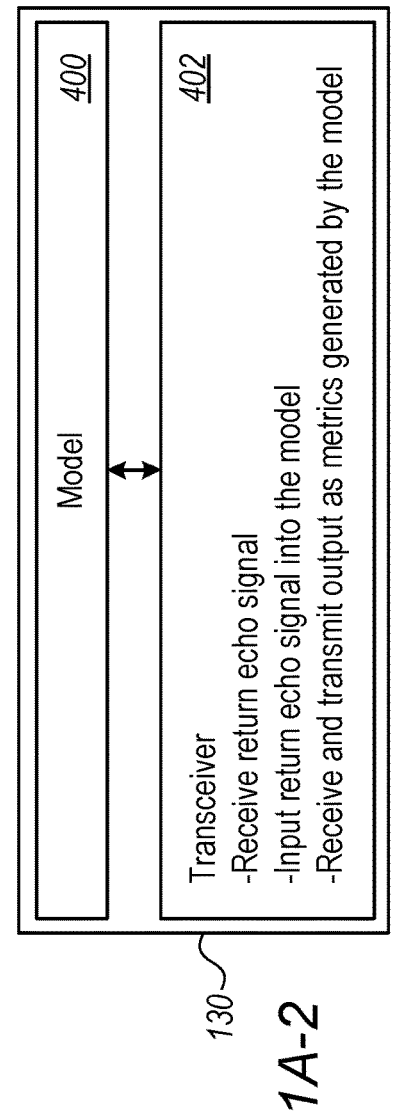

As seen in the insert 130 of FIG. 1A-2, for the processor 110, the processor 110 downloads a model 400, for example, a rules based (non-AI) model or an AI model. The processor 110 is also associated with at least one transceiver 132 to receive return echo signals and/or data associated therewith, input the signals and/or data into the model 400, and transmit the model-generated output as metrics to other system computers, processors, components, and the like, as discussed below.

Figure 1B:
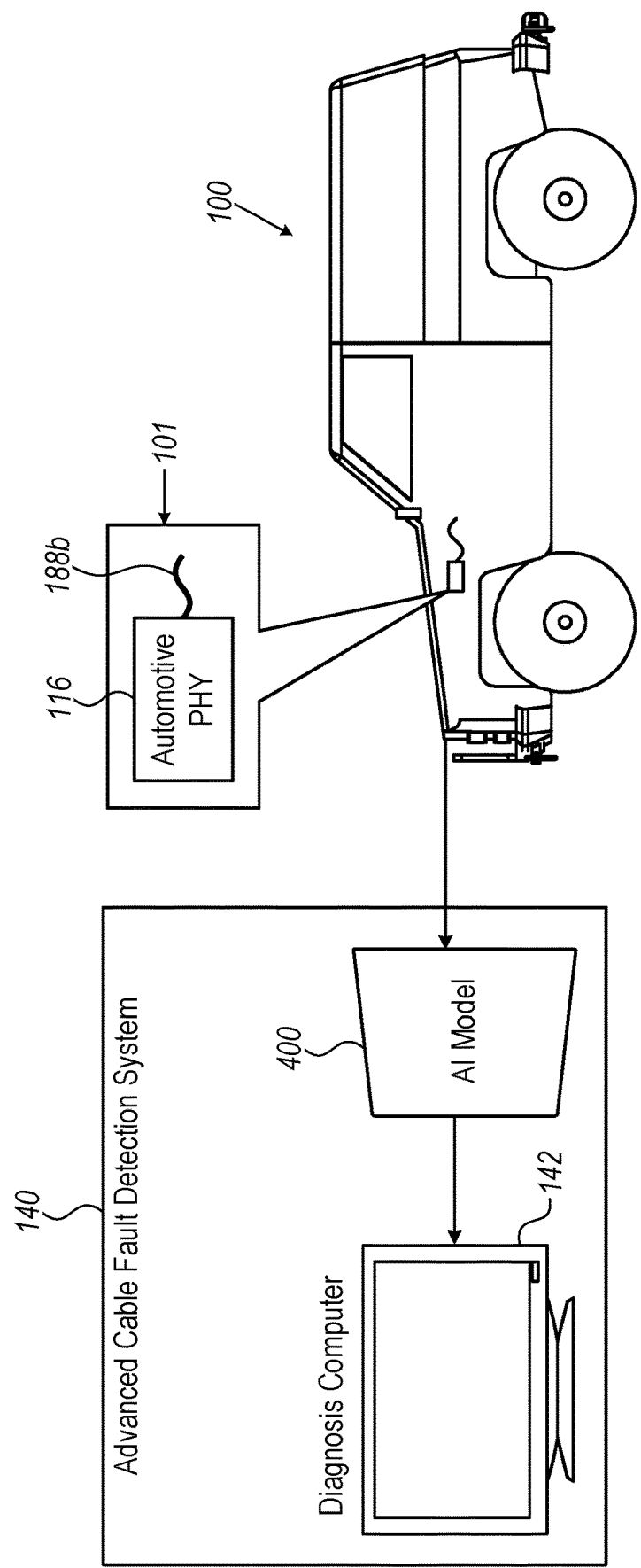
FIG. 1B is a diagram of a system external to the vehicle and the in-vehicle network (IVN), operating in accordance with an embodiment that is described herein.
Figure 2:
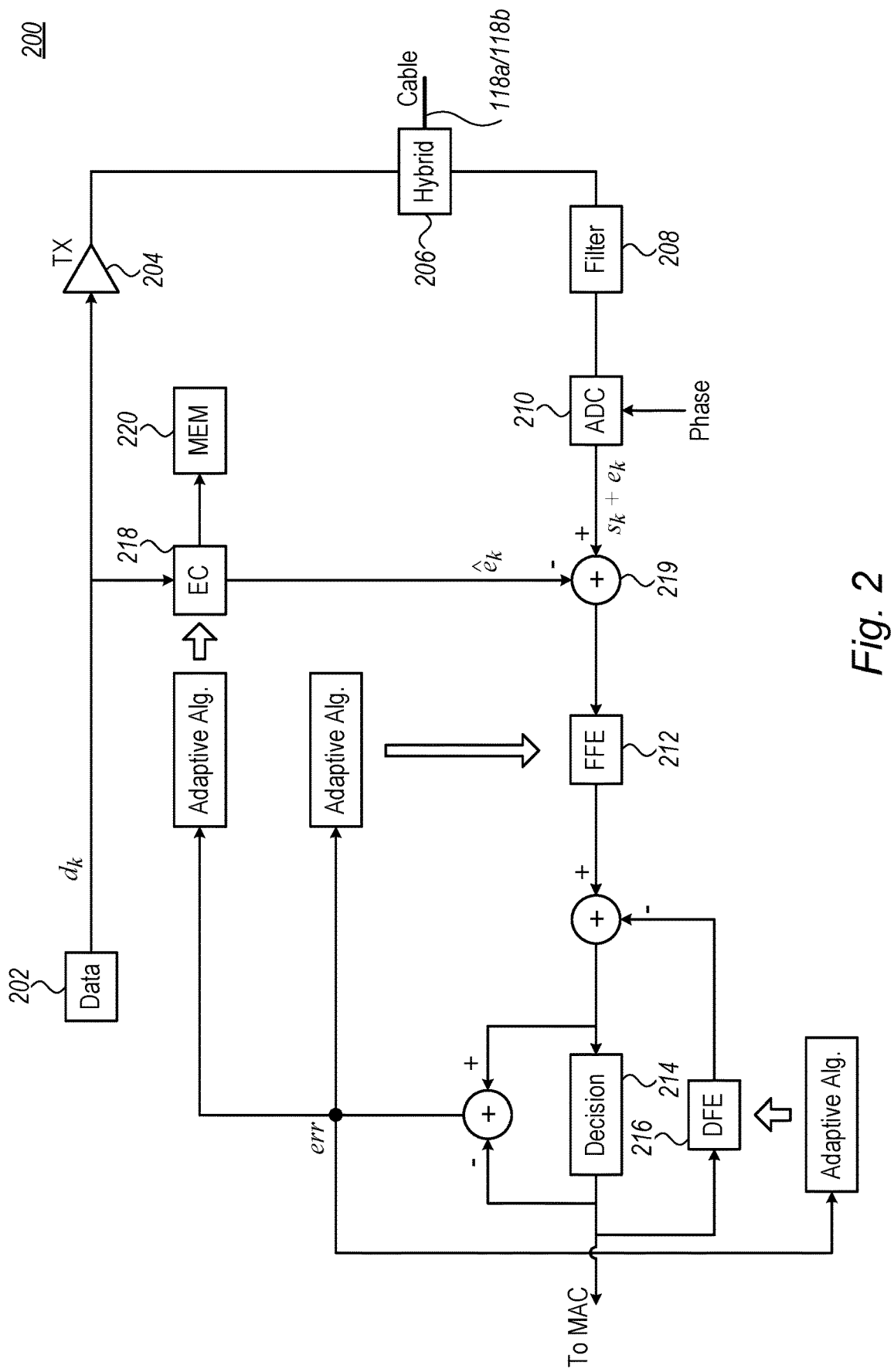

FIG. 1B shows a system 140 external to the vehicle 100 and the IVN 101 for detecting cable faults in the ethernet cable 118a, 118b connected to a PHY 116 of the vehicle 100. The system 140 includes a computer 142, which has downloaded an Artificial Intelligence (AI) model 400 or other downloadable model, including non-AI models (such as rule-based models), to receive echo responses, e.g., echo cancellation signal(s) and/or data associated therewith, from the PHY 116 to determine whether the ethernet cable 118a, 118b has a fault and if there is a fault, to determine the type of cable fault.

The configuration of the IVN 101, depicted in FIG. 1A, and the composition of network components and/or deployment of the components, such as processors 110, controllers 112, switches 114, PHYs 116 and the various other system elements such as camera 120, radar/lidar/sonar 122, or other suitable sensors 124, such as temperature sensors, magnetic field sensors, and the like, are example configurations that are depicted solely for the sake of clarity. In alternative embodiments, any other suitable configurations can be used.

The various elements of the IVN 101, e.g., such as processors 110, controllers 112, switches 114, PHYs 116 and other systems elements such as camera 120, radar/lidar/sonar 122, or other suitable sensors 124, such as temperature sensors, magnetic field sensors, and the like, may be implemented using dedicated hardware or firmware, such as using hard-wired or programmable logic, e.g., in one or more Application-Specific Integrated Circuits (ASIC) and/or one or more Field-Programmable Gate Arrays (FPGA). Additionally or alternatively, some functions of the aforementioned components of the IVN, may be implemented in software and/or using a combination of hardware and software elements. Elements that are not mandatory for understanding of the disclosed techniques have been omitted from the figure for the sake of clarity.

In some embodiments, the processors 110 of the internal computer and/or the processors of the external computer 142 (which may also be one or more computers), comprise one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

FIG. 2 shows an example PHY 116, represented as a circuit 200, in accordance with an embodiment that is described herein. PHY 116 of FIG. 2 performs echo cancellation for its internal use (for improving reception performance).

In the present example, PHY 116 comprises a data modulator 202, which outputs an Ethernet signal comprising data symbols. A transmitter (TX) 204 transmits the Ethernet signal via a hybrid combiner 206 (the hybrid combiner for splitting and combining signals to/from different channels) to cable 118a/118b. The transmitted data is destined to a peer PHY 116 (not shown) at the far side of the cable.

On reception, an Ethernet signal from the peer PHY 116 is received from cable 118a, 118b, via hybrid combiner 206, and provided to a filter 208. Filter 208 filters the received signal, e.g., using low-pass or band-pass filtering, to remove unwanted frequency components. An Analog-to-Digital Converter (ADC) 210 digitizes (samples) the signal. For example, the ADC 210 may digitize the received signals in batches of sixteen phases with 48 samples per phase, for a total of 768 samples.

The digitized signal is the filtered by a Feed-Forward Equalizer (FFE) 212. A decision circuit 214 (e.g., a slicer) decodes bits from the equalized signal. The decoded bits are passed through a physical coding sublayer (PCS—not shown in the figure), and then provided as output, e.g., to a Medium Access Control (MAC) device (not shown). For example, the MAC device may be in a switch 114. In the present example the signal is also equalized by a Decision-Feedback Equalizer (DFE) 216 whose input is taken from the output of decision circuit 214.

PHY 116 further comprises an Echo Canceller (EC) 218, which cancels echoes of the transmitted Ethernet signal that may leak into, and thus interfere with, the received Ethernet signal. Typically, EC 218 estimates the temporal waveform (the shape in time-domain) of the echo signal based on the transmitted signal, and cancels the echo signal from the received signal. Generally speaking, EC 218 generates a replica of the transmitted Ethernet signal with a magnitude and phase that matches the estimated echo signal, and then subtracts this replica from the from the received Ethernet signal. The cancellation operation is illustrated by an adder 219 in the figure.

In an embodiment, PHY 116 further comprises a storage medium, e.g., a memory 220. EC 218 stores the estimated echo signal as a vector of digital values in memory 220. The memory 220 is such that the echo signal is accessible for readout by any suitable external processor or system (e.g., by processor 110 or by computer 142), for use in detecting and classification of a possible fault in cable 118a, 118b. In an example embodiment, although not necessarily, the estimated echo signal comprises 768 digital values sampled with a sampling rate of 66.66MHz using 16 phases, yielding a resolution of 0.9376 nS per sample.

As seen in the figure, FFE 212, DFE 216 and EC 218 are controlled by suitable adaptive algorithms running on a suitable processor of the PHY device (not shown). In the present example, the input to these algorithms is an error signal (denoted err in the figure), which is indicative of the difference between the received signal and the respective bit decisions.

Either the local or internal computer, i.e., processor 110, or the computer 142 (also referred to herein as the "external computer 142") of the external cable fault detection system 140, performs an example process of cable fault detection and identification of the detected cable fault type based on the echo signal reported by PHY 116. The example process is shown at a high level in FIG. 3, to which attention is now directed.

Figure 3:
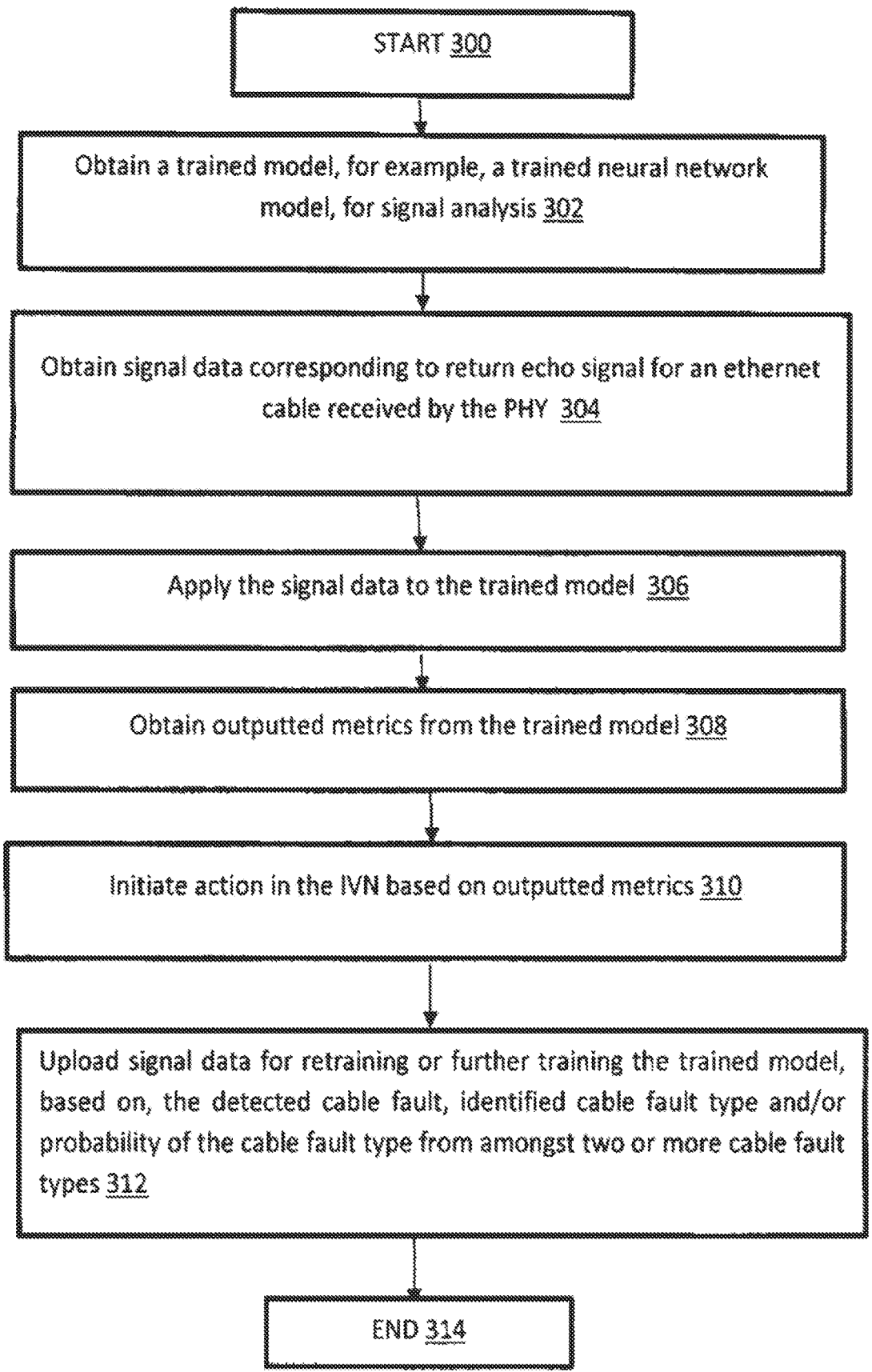
FIG. 3 is a flow diagram of an example process in accordance with an embodiment described herein.

In FIG. 3, the process starts at block 300. At this START, in an embodiment, the PHY 116 or the IVN 101 is in diagnosis mode, ready to perform cable diagnosis. The process moves to block 302, where a model, for example, a computer trained model, for detecting cable faults and identifying the type of cable fault for the detected cable fault in the cable, is obtained. The model 400 serves to distinguish among a plurality of predetermined fault types in cables (cable fault types), so as to identify a predetermined fault type, based on characteristics, e.g., shape, of the return echo signal (and/or data associated therewith, known as "signal data"), the predetermined fault types, for example, learned from computer analysis of a multiplicity of previous echo signals, from amongst at least two different predetermined fault types, in the cable.

For example, the model 400 may be a trained neural network model. This is typically achieved by the local computer 100 or the external computer 142 downloading the trained neural network model, from locations along a network, and/or the cloud. The process moves to block 304 where signal data, corresponding to return echo signals received in the PHY 116 from one or more cables 118a, 118b, is obtained from the requisite PHY 116. For example, the PHY 116 also uses this signal data to create, for example, by estimation, echo cancellation signals, which are used internally by the PHY 116.

Moving to block 306, the obtained signal data is applied to the trained model. The trained model analyzes the signal data, and determines whether the corresponding cable has a fault, and if there is a detected fault, identifying the fault, including classifying, the type of the cable fault (cable fault type) among known types of cable faults. In an optional process of block 306, the trained model may also determine the probability of the type of cable fault from amongst at least two predetermined fault types, or a set of at least two predetermined fault types.

For the cable being analyzed by the model, the detected fault type, the identified predetermined fault for the detected fault type, and optionally, the probability of the detected fault type from amongst at least two predetermined fault types, are metrics which are outputted by the model, at block 308.

The process moves to block 310, where based on the outputted metrics, and in response thereto, one or more actions are initiated, and taken, based on the identified fault type. For example, the action initiated may be one or more of: logging the fault, issuing an alert, notifying the driver or other user associated with the vehicle 100, and switching to a back up cable.

The process then moves to block 312, where the aforementioned signal data is optionally uploaded, in order to retrain or augment the training of the trained model, based on the detected cable fault and the identity of the detected cable fault. The process ends at block 314, and may be repeated for as long as desired.

Figure 4:
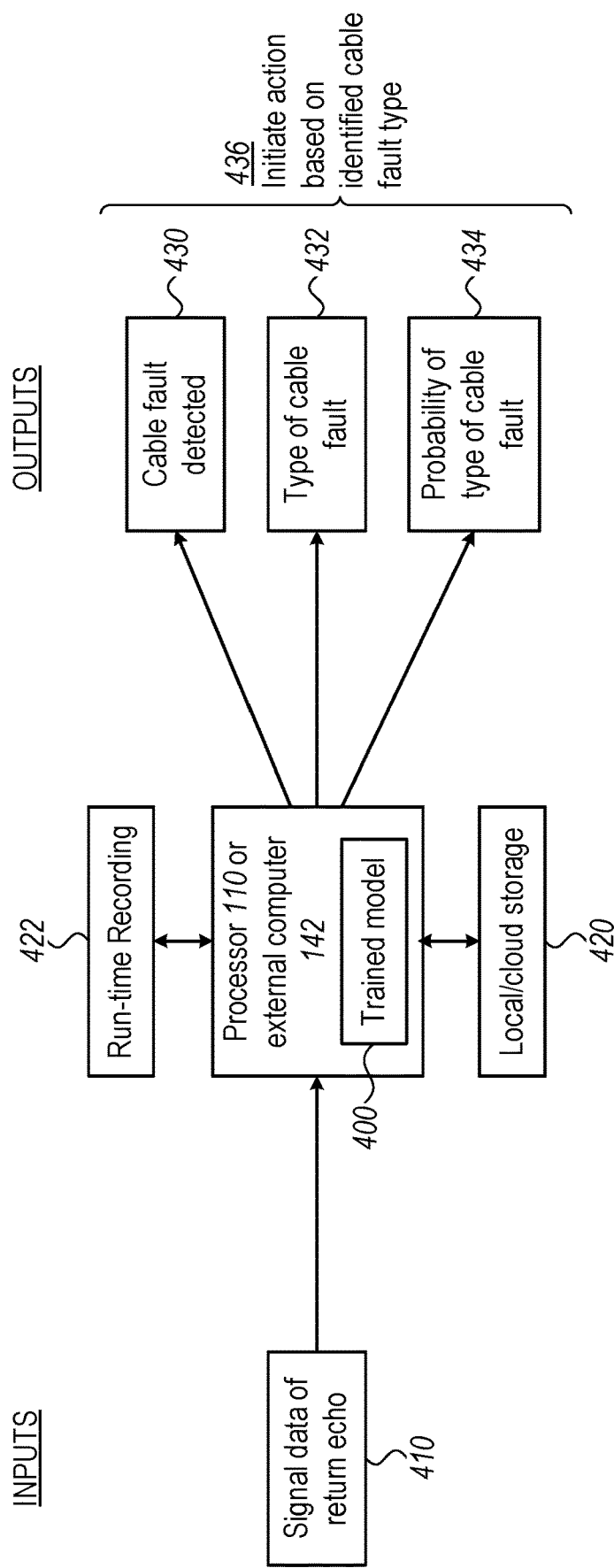
FIG. 4 is a block diagram that schematically illustrates a system architecture for determining cable faults and fault types in the in-vehicle network of FIG. 1A, in accordance with an embodiment that is described herein.

FIG. 4 is an architectural block diagram of a trained model 400, such as neural network model (e.g., an Artificial Intelligence (AI) model or machine learning (ML) model), which is downloaded into the vehicle or local computer, i.e., typically one of the processors 110, or the external computer 142, in accordance with embodiments of the disclosure. The trained model 400 (e.g., computer trained model) receives inputs, which are return echo signal data 410, for example, data associated with return echo signals from the cable 118a, 118b, the PHY 116 having received return echo signals over the ethernet cable 118a, 118b. The echo cancellation signals are expressed as values or data representative of signal shapes, for each ethernet cable 118b of the IVN 101. The echo cancellation signals and corresponding signal data are typically generated at intervals of a predetermined time, and typically are generated when the vehicle 100 is started. The aforementioned examples are for signal shapes in the time domain. Alternately, the described techniques can also be adapted to detection of signal shape anomalies in the frequency domain.

In alternate embodiments, the aforementioned signal data is received responsively to periodic queries, for example, by the onboard processor 110 in the vehicle 100, or by the external computer 142, or are received, for example, periodically in an automated manner.

In an embodiment, the trained model 400 (e.g., computer trained model) is downloaded from remote locations over external networks, such as the Internet, and portions thereof may be stored in the cloud 420. There is also an associated module for run-time recording 422. The trained model 400 running in the processor 110, or computer 142, outputs a set of metrics in response to input information, i.e., signal data representative of the return echo signal for the ethernet cable 118a, 118b, received by the PHY 116.

The set of metrics are, for example, indications, including detection of a cable fault 430, identification of the type of cable fault of the detected cable fault 432, and, the probability of the type of cable fault of the detected cable fault, from amongst two or more types of cable faults (e.g., a set of types of cable faults) 434. The results of these metrics are analyzed, for example, by the processor 110 or external computer 142 to initiate actions to be taken in the vehicle based on the identified cable fault type 436. The initiated actions include, for example, logging the cable fault (and type of cable fault), issuing an alert, notifying the driver of the vehicle or other party associated with the vehicle, and, switching to a backup cable.

Figure 6:
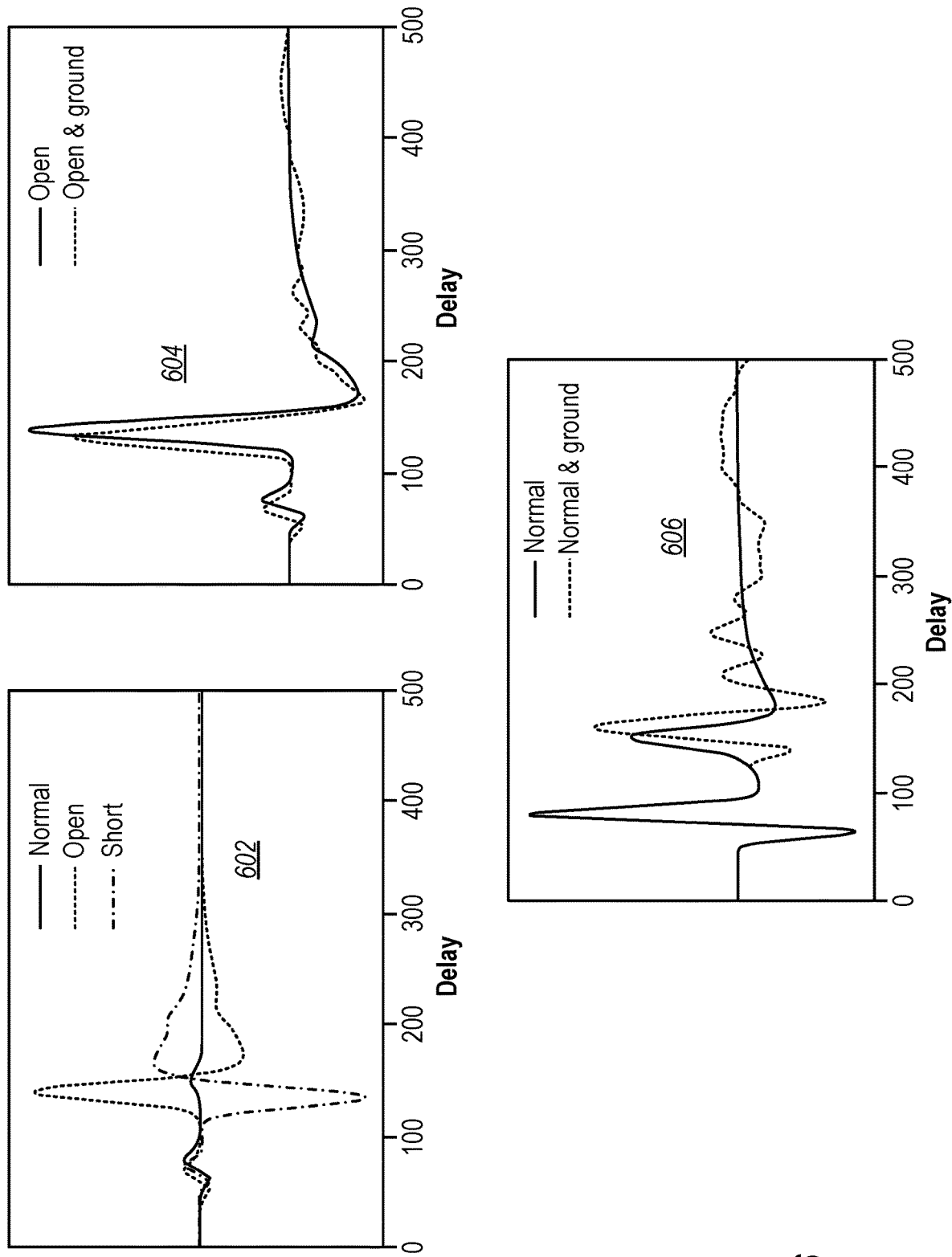
FIG. 6 is a diagram of cable fault types and corresponding echoes.

The trained model may be a rule-based model. A rule-based model operates, for example, by analyzing main peaks of a signal. As shown in FIG. 6, at box 602, a positive main peak is indicative of an open fault, a negative main peak is indicative of the fault being a short, while should their not be a significant main peak, the cable is normal.

Figure 5A:
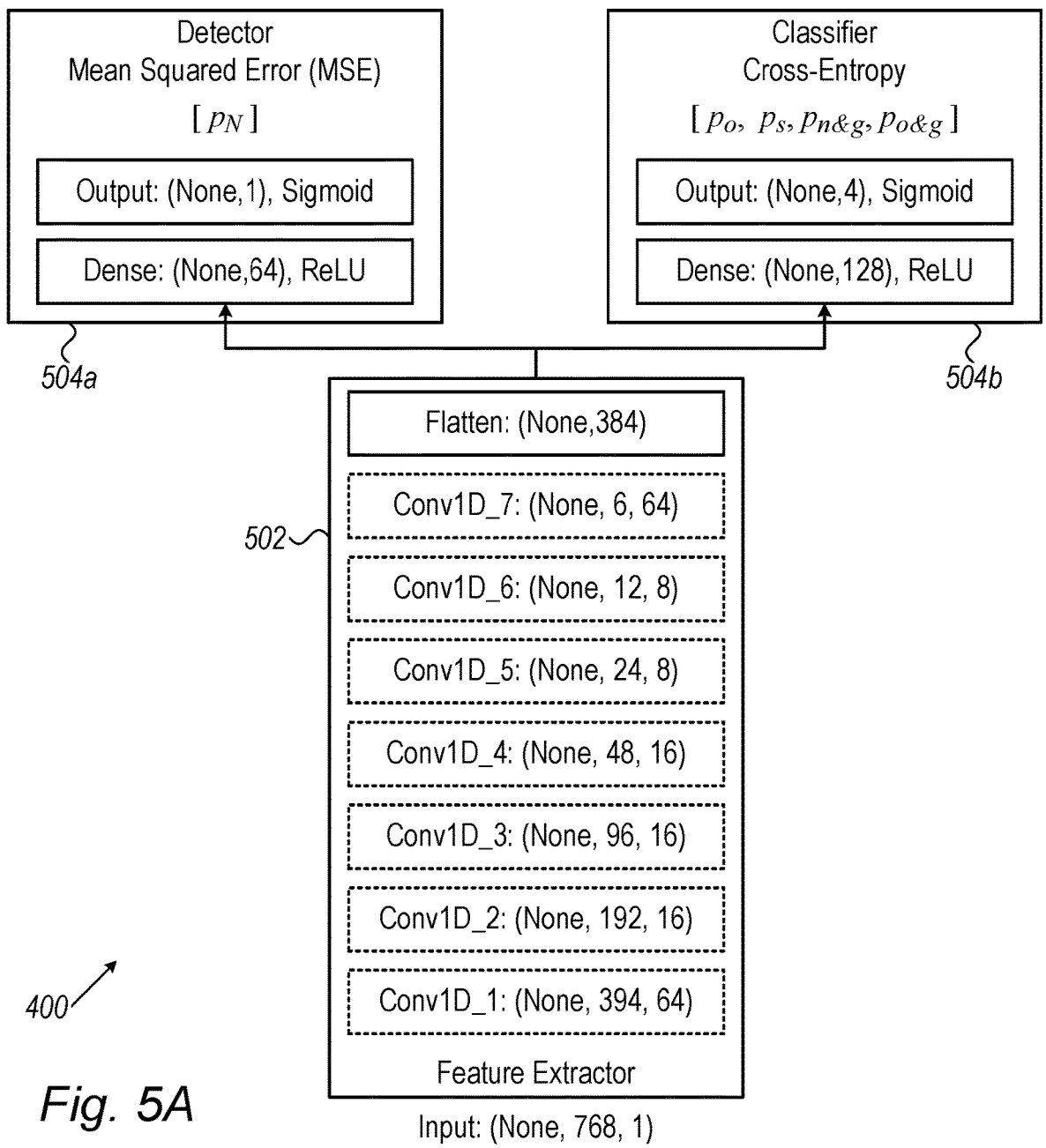
FIG. 5A is a block diagram of an example neural network structure for performing cable fault detection and identification, in accordance with an embodiment that is described herein.

Attention is now directed to FIG. 5A, which is a diagram of the network architecture for an example trained model 400, which is a neural network model, in accordance with an embodiment of the disclosure. The neural network model 400, for example, is a seven layer neural network (e.g., a seven layer convoluted feature extractor 502), with a two headed network structure (output layer with a customized loss function, which is detailed below) for fault detection 504a and fault type identification, including classification 504b. The loss function combined mean square error (MSE) for the detector 504a and cross entropy for the classifier 504b, and is expressed mathematically below.

Input, i.e., signal data, is fed into layer 1 of the neural network model 400, and, output is received from the detector 504a and classifier 504b. The number of layers, the types of layers, including hidden layers, and/or the size thereof, depends, for example, on the number of transformations to be made and the complexity of the transformations.

Figure 5B:
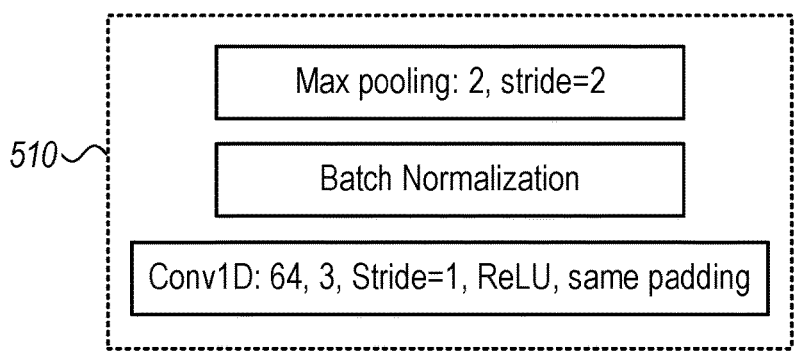
FIG. 5B is a diagram of an example layer of the neural network structure of FIG. 5A, in accordance with an embodiment that is described herein.

In an embodiment, each layer (Conv1D to Conv7D) in the feature extractor 502, is for example, a complete convolution layer 510, shown, for example, by layer 1 (Conv1D), in FIG. 5B. For example, as shown in FIG. 5A, the size of the first layer (CONV1D_1) is 394×64, the size of the second layer (CONV1D_2) is 192×16, the size of the third layer (CONV1D_3) is 96×6, the size of the fourth layer (CONV1D_4) is 48×16, the size of the fifth layer (CONV1D_5) is 24×8, the size of the sixth layer (CONV1D_6) is 12×8, and the size of the seventh layer (CONV1D_7) is 6×64. The neural network model 400 includes, for example, an activation function of nodes which are sigmoid, or which are a rectified linear unit (ReLU), to perform the desired transformations.

This particular neural network architecture is shown here solely by way of example, and the principles of the present disclosure may alternatively be implemented in other sorts of neural networks, with larger or smaller numbers of layers, and larger or smaller numbers of inputs, outputs, and nodes within each layer. The pictured neural network model 400 is applicable for ethernet cable fault determination and identification, including classification of the determined cable fault, and determining the probability of the type of fault for the determined fault, from amongst two or more (e.g., a set of) two or more predetermined cable fault types. Typically, the processor 110 or processor of the external computer 142, runs multiple models of this sort, to process cable fault information with respect to multiple ethernet cables associated with communication links and other components.

The neural network model 400, which is downloaded, for example, from the cloud or other centralized processor serving multiple vehicles, into the vehicle processor 110 or external computer 142, is trained in accordance with an objective function, for the classifier 504*b*. As the training typically large computational resources and consumes large amounts of power, the training may be done suitably in the cloud. For discrete outputs, for example, the objective function for the classifier 504*b* is based on a cross-entropy (CE) expressed as:

$$CE := -\sum_{i=1}^{M} \{y_i \log \hat{y}_i + (1 - y_i) \log(1 - \hat{y}_i)\}$$

where,
M=4, and,
y1~y4 corresponds to the true probability of a cable fault.

For example, if the fault type is "open", y1~y4 may be [0.9, 0, 0, 0.1], corresponding to [$p_o$, $p_s$, $p_{n\&g}$, $P_{o\&g}$] for the classifier 504*b*.

For continuous outputs, such as the fault determination and identification, including classification of the fault, and determining the probability of the fault type, from amongst two or more predetermined cable fault types, a loss function is determined, for the ethernet cable. The loss function is based on a mean-square-error (MSE), for the detector 504*a*, and cross entropy (CE) for the classifier 504*b*. The final or customized loss function (e.g., Total loss (TL)) is expressed as a weighted sum, with weights w1 and w2:

$$TL = w1*MSE + w2*CE$$

Any suitable algorithm may be used to train the neural network model 400 based on this customized loss function. For example, the algorithm may be an Adam Optimization algorithm, and random initial weights may be used. The learning rate for the customized loss function can be controlled by adjusting the learning rate during training of the neural network model.

The trained neural network model 400 is trained, for example, in a remote server along a network or in the cloud. The training of the neural network model is, for example, by receiving inputs which are signal shapes, indicative of a normal cable or various cable fault types from detected cable faults, from numerous vehicles (IVNs), different from the vehicle 100, which are uploaded to the neural network model 400. Training the neural network model 400 using inputs from many vehicles is, for example, typically centralized, so that the trained model benefits from a large volume of inputs, so that the trained model can serve a given vehicle (e.g., typically an individual vehicle), such as the vehicle 100.

For example, the model 400 is trained based on known or predetermined signal shapes, for various types of cable faults, obtained from numerous IVNs of numerous vehicles. The aforementioned predetermined echo signal shapes for a normal cable and various cable fault types are shown, for example, in FIG. 6. For an ethernet cable length of approximately 6 meters: 1)box 602 shows return echo signal shapes for normal (a cable without faults), an open fault, or a short fault, in the ethernet cable; 2) box 604 shows return echo signal shapes for an open fault, or an open and ground fault, in the ethernet cable; and, 3) box 606 shows return echo signal shapes for normal (a cable without faults), and normal and ground fault, in the ethernet cable. The model 400 analyzes the shape of the return echo signal, from the signal data, against the shape of the signal for each cable fault type to determine, whether there is a cable fault, and if there is a cable fault, to identify or otherwise classify the type of the cable fault, or determine the probability of the type of cable fault, for the detected cable fault, from amongst at least two different types of cable faults, based on signal shapes.

For example, the trained neural network model 400 is trained based on: collected signal data from components, i.e., PHYs 116 of the IVN 101, in a set or plurality of vehicles, different from the vehicle (e.g., the given vehicle) 100, to which the neural network model 400 is being downloaded to a local computer (e.g., processor 110), or external computer 142, thereof, over a period of time. The model, for example, determines whether there is a predetermined fault in the cable, and distinguishes among a plurality of predetermined fault types in cables in a vehicular network, so as to identify a predetermined fault type, for the determined predetermined fault, in the cable, based on characteristics of a return echo signal in the cable, for example, the predetermined fault type learned from computer analysis of a multiplicity of previous echo signals, from amongst at least two different predetermined fault types (or from a set of at least two different predetermined fault types), and/or optionally determining a probability for the identified predetermined fault type in the cable from predetermined from amongst at least two different predetermined fault types (or from a set of at least two different predetermined fault types). For example, the predetermined fault types in the cable include: short circuit (short), open circuit (open), open and ground, normal and ground, one wire shorted to ground, one wire shorted to power, one wire open, two wires shorted to ground, two wires shorted to power, and two wires open.

The collected signal data is uploaded, for example, periodically, to a centralized processor for training the trained neural network model 300, where the trained neural network model 400 resides, such as along a network remote from the vehicle 100, the local computer 110 of the vehicle 100, the external computer 142, or the cloud.

The neural network model 400 is trained to generate, based on the collected signal data, a set of metrics, for example, as shown and described for FIG. 4. The set of metrics indicates a detected fault in the cable 430, the type (identified type) of cable fault for the detected cable fault 432, and for the detected cable fault, the probability of the fault type from amongst two or more predetermined fault types 434, along with the action to be initiated in response to the detected and identified cable fault type 436.

The trained neural network model is deployed, for example, as a software package (that may be downloadable, for instance when the vehicle is parked and connected to an external wired or wireless network connection), for installation on the local vehicle 100 computer, e.g., processors 110, or external computer 142 (e.g., processors). The trained neural network model is typically associated with an application programming interface (API) to update the trained neural network model 400.

Figure 7:
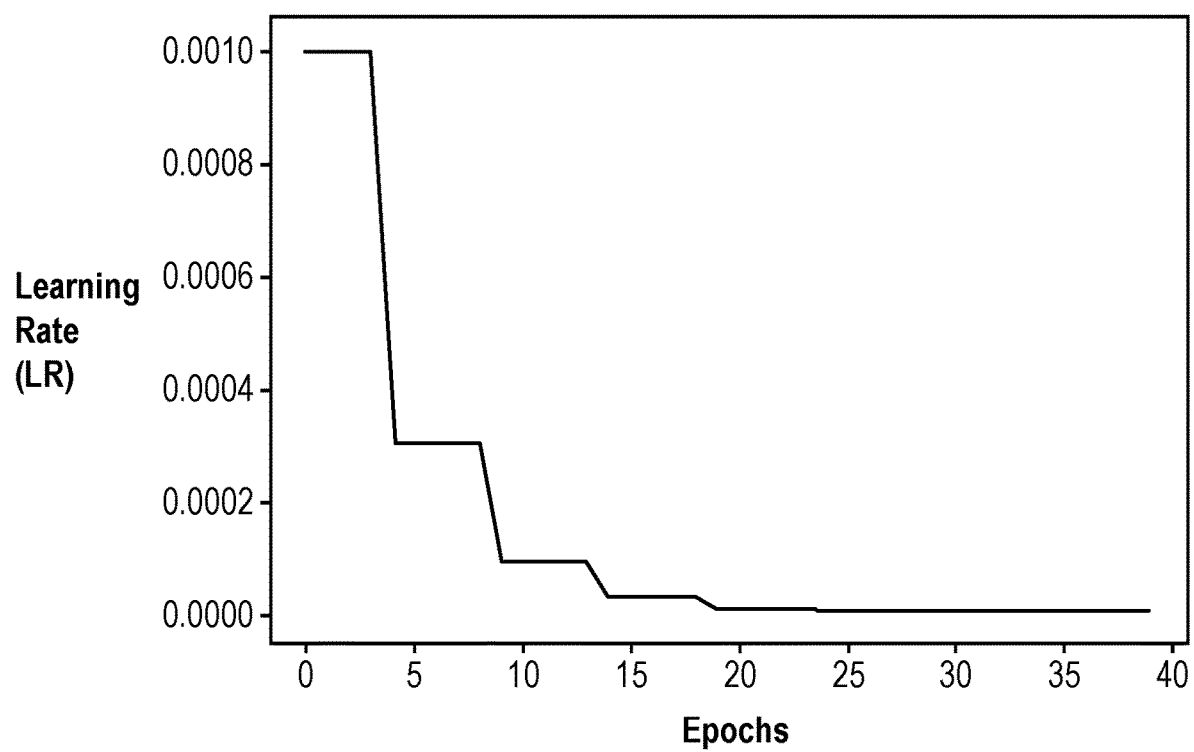
FIG. 7 is a diagram of training rates for a neural network model in accordance with an embodiment that is described herein.

FIG. 7 is a diagram of a training setup for the neural network model 400. Training rate is based, for example, on a loss function, a combined mean square error and cross entropy, an optimization algorithm, such as a Root Mean Square Propagation (RMSProp). The diagram shows an adjustable learning rate for the model 400, as a learning rate (LR) (y-axis), against Epochs (x-axis), a time-based value. Initially, training is performed at a rapid rate, and slows down over time.

Figure 8A:
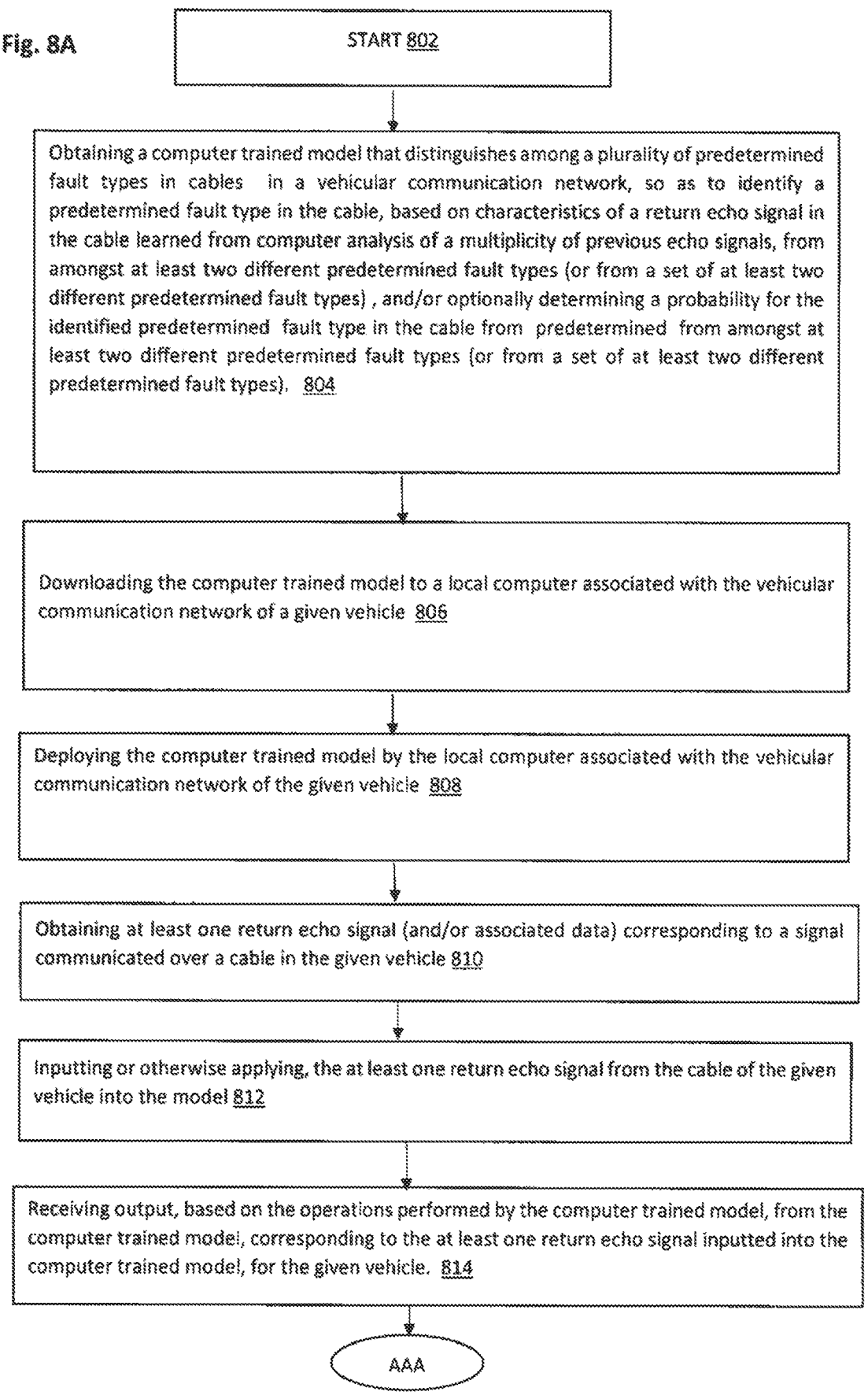
FIGS. 8A and 8B are a flow diagram of a process performed by the system of FIG. 4, in accordance with an embodiment that is described herein.
Figure 8B:
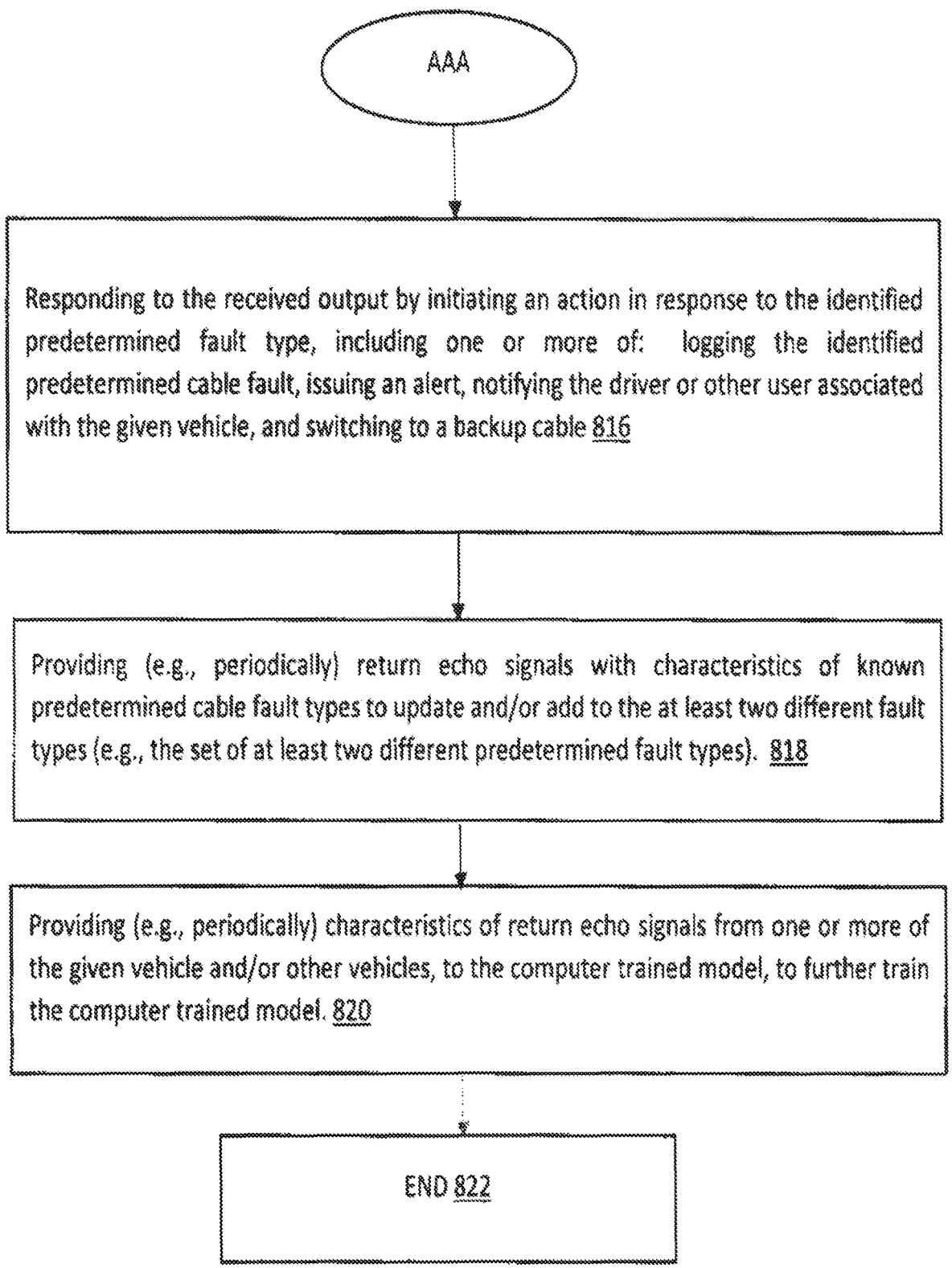

Attention is now directed to FIGS. 8A and 8B which show a flow diagram detailing a computer-implemented process in accordance with embodiments of the disclosed subject matter. The aforementioned process, which includes subprocesses, is performed, for example, automatically and/or in real time.

The process begins at a START block 802, where the local computer associated with the vehicular communication network, such as the local computer 110 of the IVN of the vehicle 100, i.e., a given vehicle, or the external computer 142, is activated. The process moves to block 804, where a model, e.g., a computer trained model, is obtained.

The computer trained model distinguishes among a plurality of predetermined fault types in cables in a vehicular communication network, so as to identify a predetermined fault type in the cable, based on characteristics of a return echo signal in the cable, learned from computer analysis of a multiplicity of previous echo signals, from amongst at least two different predetermined fault types (or from a set of at least two different predetermined fault types), and/or optionally determining a probability for the identified predetermined fault type in the cable from predetermined from amongst at least two different predetermined fault types (or from a set of at least two different predetermined fault types). For example, the predetermined fault types in the cable include: short circuit (short), open circuit (open), open and ground, normal and ground, open and ground, normal and ground, one wire shorted to ground, one wire shorted to power, one wire open, two wires shorted to ground, two wires shorted to power, and two wires open.

The characteristics of the return echo signal include, for example, the shape of the return echo signal. Applying the computer trained model includes, for example, analyzing the shape of the return echo signal against a predetermined shape of at least two return echo signals, each of the predetermined echo signal shapes associated with a predetermined cable fault type from amongst at least two different predetermined fault types.

Additionally, the at least one obtained return echo signal may be, for example, a plurality of return echo signals, each of the return echo signals acquired from a corresponding cable of the IVN 101. Applying the computer trained model includes analyzing each return echo signal to identify a predetermined cable fault type in each cable, from amongst at least two predetermined fault types.

The computer trained model for example, may be an Artificial Intelligence (AI) model, which is pre-trained to distinguish the predetermined fault type in the cable from amongst the at least two predetermined fault types (or from a set of at least two different predetermined fault types). The AI model, for example, comprises multiple feature extraction layers, which are configured to determine that the cable has a fault and to identify the fault type, such that the detected fault is identified as one of the predetermined fault types. The AI model may, for example, include one or more of a trained neural network and/or a machine learning model.

The process moves to block 806 where the computer trained model is downloaded to the local computer associated with the vehicular communication network, e.g., the local computer 110, or external computer 142, associated with the vehicular communication network of the given vehicle. The computer trained model is then deployed by the local computer associated with the vehicular communication network, e.g., the local computer 110, or external computer 142, of the given vehicle, at block 808. The process moves to block 810, where at least one return echo signal (and/or data associated therewith) corresponding to a signal communicated over a cable in the given vehicle, is obtained.

The process moves to block 812, where the at least one return echo signal (and/or return echo signal data) from the cable of the given vehicle is input, or otherwise applied, into the computer trained model. Next, at block 814, output from the model is received, the output is based on the operations performed by the computer trained model, corresponding to the at least one return echo signal (and/or return echo signal data) which was inputted into the computer trained model, for the given vehicle.

The process moves to block 816, where a response is made to the received output, by initiating an action in response to the identified predetermined fault type, including one or more of: logging the identified predetermined cable fault, issuing an alert, notifying the driver or other user associated with the given vehicle, and switching to a backup cable.

Moving to block 818, return echo signals with characteristics of known predetermined cable fault types are provided (e.g., periodically) to update and/or add to the at least two different fault types (e.g., the set of at least two different predetermined fault types). Next, at block 820, characteristics of return echo signals from one or more of the given vehicle and/or other vehicles, are provided (e.g., periodically) to the computer trained model, to further train the model.

The process moves to block 822, were it ends. The process may be repeated for as long as desired.

The processors 110 (of the local computer in the vehicle) or the external computer 142, for example, may comprise general-purpose computers, which are programmed in software, including trained neural network models, to carry out the functions described herein. The software may be downloaded to the computer in electronic form, over a network, for example, or it may, alternatively or additionally, be provided and/or stored on non-transitory tangible media, such as magnetic, optical, or electronic memory.

Although the embodiments described herein mainly address automotive applications (e.g., cars and trucks), the methods and systems described herein can also be used in other sorts of vehicular networks, such as in aircraft and boats.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for fault diagnosis in one or more cables of a vehicular communication network, the method comprising:
   obtaining a return echo of a data-carrying communication signal transmitted over a cable in a vehicle;
   applying, to the return echo of the data-carrying communication signal, a computer trained model that distinguishes among a plurality of predetermined fault types in cables by analyzing a signal shape of the return echo against a plurality of signal shapes of echoes associated with the plurality of predetermined fault types, so as to identify a predetermined fault type in the cable; and
   initiating an action in response to the identified predetermined fault type.

2. The method for fault diagnosis of claim 1, wherein applying the computer trained model comprises applying an Artificial Intelligence (AI) model that is pre-trained to distinguish the predetermined fault type in the cable from amongst the plurality of predetermined fault types.

3. The method for fault diagnosis of claim 2, wherein the AI model comprises multiple feature-extraction layers configured to determine that the cable has a fault, and to identify the predetermined fault type.

4. The method for fault diagnosis of claim 2, wherein the AI model includes one or more of: a trained neural network and/or a machine learning model.

5. The method for fault diagnosis of claim 1, wherein obtaining the return echo comprises receiving the return echo by an Ethernet physical layer (PHY) device that applies echo cancellation in response to the receiving the return echo.

6. The method for fault diagnosis of claim 1, wherein applying the computer trained model to the return echo includes determining a probability of the cable exhibiting the identified predetermined cable fault type selected from amongst the plurality of predetermined cable fault types.

7. The method for fault diagnosis of claim 1, wherein the plurality of predetermined fault types in cables includes two or more of:
   Short circuit (short);
   Open circuit (Open);
   Open and ground;
   Normal and ground;
   one wire shorted to ground;
   one wire shorted to power;
   one wire open;
   two wires shorted to ground;
   two wires shorted to power; and
   two wires open.

8. The method for fault diagnosis of claim 1, wherein obtaining the return echo includes obtaining a plurality of return echoes from a corresponding plurality of cables; and applying the computer trained model to analyze each of the return echoes to identify a respective predetermined fault type in each of the cables, from amongst the plurality of predetermined fault types.

9. The method for fault diagnosis of claim 1, wherein the initiating an action comprises one or more of: logging the fault, issuing an alert, notifying the driver or other user, and switching to a backup cable.

10. A system for diagnosing faults in one or more cables of a vehicular communication network, the fault diagnosis system comprising:
    one or more processors; and
    a program memory storing executable instructions that, when executed by the one or more processors, cause the system to:
       obtain a return echo of a data-carrying communication signal transmitted over a cable in a vehicle;
       apply, to the return echo of the data-carrying communication, a computer trained model that distinguishes among a plurality of predetermined fault types in cables by analyzing a signal shape of the return echo against a plurality of signal shapes of echoes associated with the plurality of predetermined fault types, so as to identify a predetermined fault type in the cable; and
       initiate an action in response to the identified fault type.

11. The system for diagnosing faults of claim 10, wherein the computer trained model comprises an Artificial Intelligence (AI) model to determine a probability of the identified predetermined type of fault from amongst the plurality of predetermined fault types.

12. The system for diagnosing faults of claim 11, wherein the AI model includes one or more of: a trained neural network and/or a machine learning model.

13. A system for diagnosing faults in a cable in an automotive or industrial network, the system comprising:
    an Ethernet physical layer (PHY) device, comprising:
       a transmitter for transmitting an outbound data-carrying Ethernet communication signal to the cable;
       a receiver for receiving an inbound Ethernet communication signal from the cable, the received inbound Ethernet communication signal comprising a return echo caused by the transmitted outbound data-carrying Ethernet communication signal;
       an echo canceller for estimating the return echo and canceling the return echo in the received inbound Ethernet communication signal; and
       storage media in communication with the echo canceller for storing the estimated return echo, the stored estimated return echo being available for readout externally to the Ethernet PHY device; and
    a processor or computer external to the Ethernet PHY device, the processor or computer configured to:
       read the estimated return echo from the storage media of the Ethernet PHY device;
       apply, to the return echo of the outbound data-carrying Ethernet communication signal, a computer trained model that distinguishes among a plurality of predetermined fault types in cables by analyzing a signal shape of the return echo against a plurality of signal shapes of echoes associated with the plurality of predetermined fault types, so as to identify a predetermined fault type in the cable; and
       initiate an action in response to the identified fault type.

14. The system for diagnosing faults of claim 13, wherein the return echo is of a predetermined size.

\* \* \* \* \*